United States Patent
Medford et al.

(10) Patent No.: US 9,554,180 B2
(45) Date of Patent: *Jan. 24, 2017

(54) SYSTEM AND METHOD OF PROCESSING A SATELLITE SIGNAL

(71) Applicant: AT&T Intellectual Property I, L.P., Atlanta, GA (US)

(72) Inventors: Brad Allen Medford, Austin, TX (US); Ahmad Ansari, Austin, TX (US); Dinesh Nadarajah, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 771 days.

This patent is subject to a terminal disclaimer.

(21) Appl. No.: 13/871,815

(22) Filed: Apr. 26, 2013

(65) Prior Publication Data

US 2013/0239152 A1 Sep. 12, 2013

Related U.S. Application Data

(63) Continuation of application No. 11/337,782, filed on Jan. 23, 2006, now Pat. No. 8,453,183.

(51) Int. Cl.
| H04N 7/20 | (2006.01) |
| H04N 21/438 | (2011.01) |
| H04N 21/61 | (2011.01) |

(52) U.S. Cl.
CPC ...... *H04N 21/4382* (2013.01); *H04N 21/6143* (2013.01)

(58) Field of Classification Search
CPC .................. H04N 21/4382; H04N 21/6143
See application file for complete search history.

(56) References Cited

U.S. PATENT DOCUMENTS

| | | |
|---|---|---|
| 6,005,605 A | 12/1999 | Kostreski et al. |
| 6,490,001 B1 | 12/2002 | Shintani et al. |
| 6,526,580 B2 | 2/2003 | Shimomura et al. |
| 6,577,414 B1 | 6/2003 | Feldman et al. |
| 6,738,102 B1* | 5/2004 | Park ........................ H04L 27/02 348/552 |
| 6,747,983 B1* | 6/2004 | Knutson .............. H04N 21/235 348/E5.007 |
| 6,769,093 B1 | 7/2004 | Krieger |
| 6,788,710 B1 | 9/2004 | Knutson et al. |
| 6,889,385 B1 | 5/2005 | Rakib et al. |

(Continued)

*Primary Examiner* — Nathan Flynn
*Assistant Examiner* — Alfonso Castro
(74) *Attorney, Agent, or Firm* — Toler Law Group, PC (57) ABSTRACT

A system includes a converter to receive a receiving a satellite signal at first transport frequencies and to convert the satellite signal to second transport frequencies and a processor. The processor removes a radio frequency portion from the satellite signal without altering a sequence of media contents of a moving picture experts group portion of the satellite signal and without altering a quality of the media contents of the moving picture experts group portion. The processor determines whether the media contents include an error and corrects the error in the moving picture experts group portion with error correction data of the satellite signal. The processor encrypts the media contents to produce an encrypted digital moving picture experts group transport stream signal. The processor also sends the encrypted digital moving picture experts group transport stream signal to a modulator.

20 Claims, 7 Drawing Sheets

(56) References Cited

U.S. PATENT DOCUMENTS

| | | |
|---|---|---|
| 2002/0009135 A1 | 1/2002 | Omura et al. |
| 2002/0066102 A1 | 5/2002 | Chapman et al. |
| 2004/0073862 A1 | 4/2004 | Armstrong et al. |
| 2004/0086120 A1 | 5/2004 | Akins, III et al. |
| 2004/0148634 A1 | 7/2004 | Arsenault et al. |
| 2005/0036512 A1 | 2/2005 | Loukianov |
| 2005/0182931 A1 | 8/2005 | Robert et al. |
| 2005/0210145 A1 | 9/2005 | Kim et al. |
| 2005/0271158 A1 | 12/2005 | Birru |
| 2007/0174875 A1 | 7/2007 | Medford et al. |
| 2008/0046947 A1 | 2/2008 | Katznelson |

\* cited by examiner

SYSTEM AND METHOD OF PROCESSING A SATELLITE SIGNAL

PRIORITY CLAIM

This application is a continuation of, and claims priority to, U.S. patent application Ser. No. 11/337,782 filed on Jan. 23, 2006, which is hereby incorporated by reference in its entirety.

FIELD OF THE DISCLOSURE

The present disclosure is generally related to processing a satellite signal.

BACKGROUND

Technological advancements in television and video transmission services have enabled providers to offer viewers a broad range of entertainment. For example, the growth of cable and satellite delivery systems has allowed content providers to increase programming from fifty channels to over five hundred channels, in just a decade. The increase in the number of available channels allows viewers to watch their favorite types of content, such as sports, comedy, news, and documentaries, at nearly any time of day, simply by switching to a channel that is dedicated to the content type.

The growth of satellite delivery systems has presented technical dilemmas when transmitting a satellite signal to more than one destination. The L-band transport frequencies that are often used to transport satellite signals after they are received at a satellite dish typically require signal conversion to achieve transmission over consumer grade coaxial cable networks. During the conversion process, the signals can be converted from more robust, higher bandwidth signals to less robust, more bandwidth-efficient signals. Video and audio portions carried by the signals are typically altered or otherwise manipulated during this conversion process, which can lessen video and/or audio quality. Hence, there is a need to transport satellite signals to multiple destination devices via signals that support large data payloads, without significantly altering video or audio portions carried by the signals.

DETAILED DESCRIPTION

A method of processing a satellite signal is disclosed and includes receiving a satellite signal at a receiver, where the satellite signal includes a Moving Picture Experts Group (MPEG) portion and a radio frequency (RF) portion. The method also includes decoding the satellite signal to produce a digital MPEG transport stream signal that includes the MPEG portion, by removing the RF portion from the satellite signal without substantially altering the MPEG portion. The method also includes transmitting the digital MPEG transport stream signal to a vestigial sideband (VSB) modulator, where the VSB modulator transmodulates the digital MPEG transport stream signal to a VSB signal.

In another embodiment, a system to process a satellite signal is disclosed and includes a receiver having an input to receive a satellite signal, where the satellite signal includes a Moving Picture Experts Group (MPEG) portion and a radio frequency (RF) portion. The system also includes a decoder integrated with the receiver to remove the RF portion from the satellite signal, without substantially altering the MPEG portion, where the decoder has an output to provide a digital MPEG transport stream signal that includes the MPEG portion. The receiver is configured to transmit the digital MPEG transport stream signal to a vestigial sideband (VSB) modulator that includes logic to transmodulate the digital MPEG transport stream signal to a VSB signal that includes the MPEG portion, where the VSB signal suitable for transmission to a plurality of subscriber devices via a private access network.

In another embodiment, a computer program embedded in a computer-readable medium is disclosed and includes instructions to produce a digital MPEG transport stream signal from a satellite signal, by removing a radio frequency (RF) portion of the satellite signal without substantially altering a Moving Picture Experts Group (MPEG) portion of the satellite signal. The computer program also includes instructions to transmit the digital MPEG transport stream signal to a vestigial sideband (VSB) modulator to transmodulate the digital MPEG transport stream to a VSB signal that is suitable for transmission to a plurality of subscriber devices via a private access network.

Figure 1:
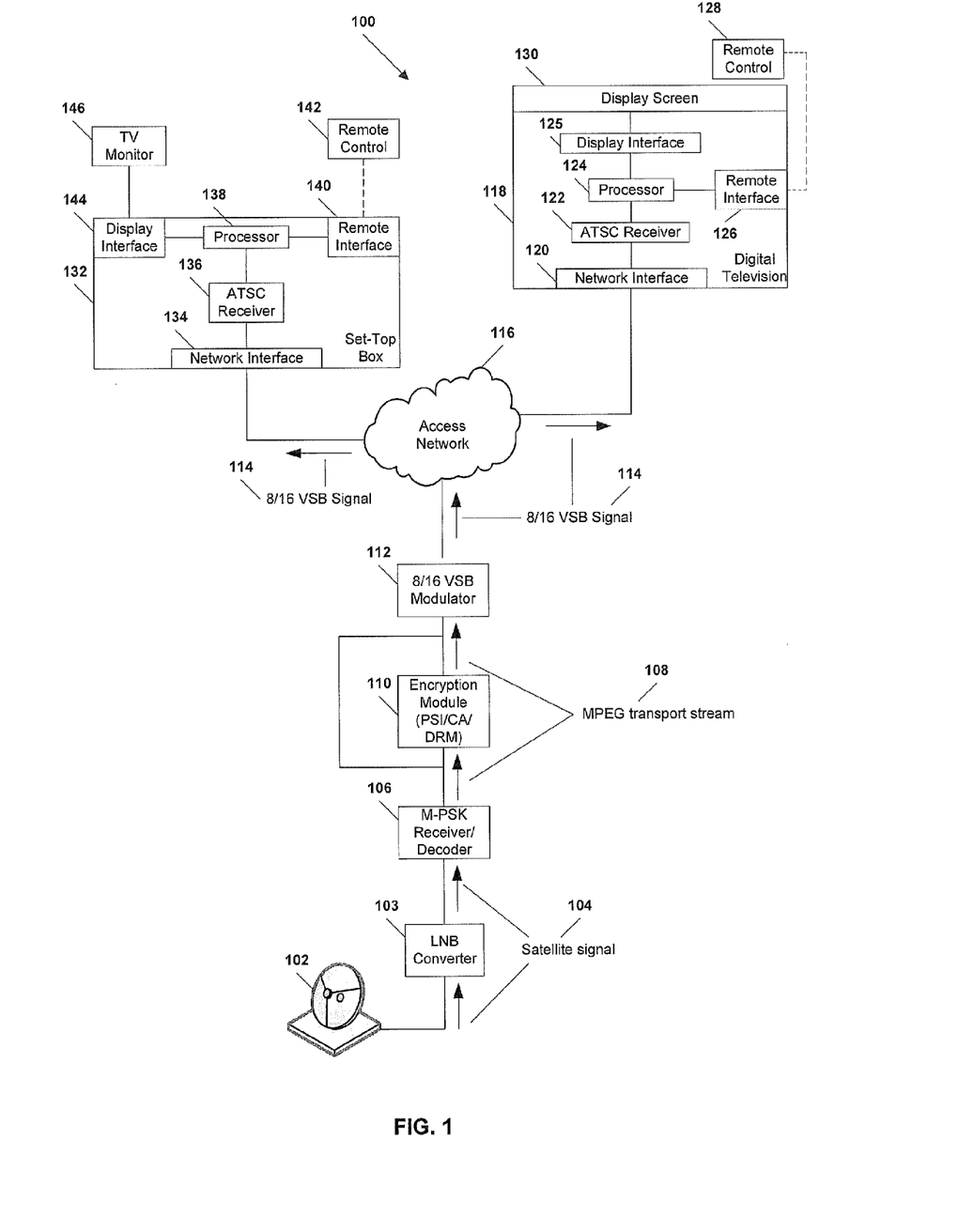
FIG. 1 is a block diagram illustrating a particular embodiment of a system to deliver television content.

Referring to FIG. 1, an illustrative embodiment of a system to deliver television content by processing a received satellite signal is illustrated and is generally designated 100. As shown, the system 100 can include a satellite dish 102. The satellite dish 102 is coupled to a receiver/decoder 106. In a particular embodiment, the satellite dish 102 can be coupled to a low-noise blockdown (LNB) converter 103 that is coupled to the receiver/decoder 106. In another embodiment, the LNB converter 103 can be integrated with the receiver/decoder 106.

The receiver/decoder 106 is coupled to a vestigial sideband (VSB) modulator 112. In a particular embodiment, the receiver/decoder 106 is coupled to an encryption module 110, which is coupled to the VSB modulator 112. In an illustrative embodiment, the VSB modulator 112 can be configured to transmodulate signals to 8-V SB signals, 16-VSB signals, or any combination thereof. Additionally, the VSB modulator 112 can be configured to transmit VSB signals 114 carrying television content to subscriber devices such as a digital television device 118, a set-top box device 132, or any combination thereof, via a private access network 116. Subscriber devices 118, 132 can communicate with the private access network 116 via coaxial cables, fiber optic cables, twisted pairs, or any combination thereof.

As illustrated in FIG. 1, a subscriber can receive VSB signals 114 via the private access network 116 at a digital television device 118. In a particular embodiment, the digital television device 118 can receive VSB signals 114 via a network interface 120 that communicates with an Advanced Television Systems Committee standards-compliant receiver ("ATSC receiver") 122. The ATSC receiver 120 is coupled to a processor 124 that communicates with a display screen 130 via a display interface 125. Additionally, the processor 124 can be coupled to a remote interface 126, through which the processor 124 receives commands from a remote control device 128.

In one embodiment, a subscriber can receive VSB signals 114 via the private access network 116 at a set-top box device 132. In a particular embodiment, the set-top box device 132 can receive VSB signals 114 via a set-top box network interface 134 that communicates with a set-top box ATSC receiver 136. The set-top box ATSC receiver 136 is coupled to a set-top box processor 138 that communicates with a television monitor 146 via a set-top box display interface 144. Additionally, the set-top box processor 138 can be coupled to a set-top box remote interface 140, through which the processor 138 receives commands from a remote control device 142.

In a particular embodiment, a satellite signal 104 having a radio frequency (RF) portion and a Moving Pictures Experts Group (MPEG) portion can be received from the satellite dish 102 at the receiver/decoder 106. The satellite signal 104 can be, for example, a M-phase shift keying PSK (M-PSK) signal, such as a quadrature phase shift keying (QPSK) or octal phase shift keying (OPSK) signal. In an illustrative embodiment, the satellite signal 104 can be received at the dish via C-band transport frequencies (3700 MHz-4200 MHz) or Ku-band transport frequencies (11,700 MHz-12,200 MHz), and the LNB converter 103 can convert the satellite signal 104 to L-band transport frequencies (500 MHz-1500 MHz).

The receiver/decoder 106 decodes the satellite signal 104 to produce a digital MPEG transport stream signal 108. In a particular embodiment, the receiver/decoder 106 can include hardware logic, computer program instructions, or any combination thereof, to remove the RF portion of the satellite signal 104 when decoding the satellite signal 104 without substantially altering or affecting the MPEG portion, for example, by altering the sequence of the content or altering the quality of audio and/or video included in the MPEG portion. In an illustrative embodiment, the digital MPEG transport stream signal 108 produced by decoding the satellite signal 104 can include a forward error correction (FEC) portion, a cyclical redundancy check (CRC) portion, a conditional access (CA) portion, any other portion suitable to correct errors and restrict access to the digital MPEG transport stream signal 108, or any combination thereof. In this embodiment, the receiver/decoder 106 can include hardware logic, instructions, or any combination thereof, to remove the forward error correction (FEC) portion, the cyclical redundancy check portion, the conditional access portion, any portion of the digital MPEG transport stream signal 108 other than the MPEG portion, or any combination thereof.

In a particular embodiment, the receiver/decoder 106 is configured to transmit the digital MPEG transport stream signal 108 to the VSB modulator 112. Alternatively, the receiver/decoder 106 can be configured to transmit the digital MPEG transport stream signal 108 to the encryption module 110 that encrypts the digital MPEG transport stream signal 108 and transmits the resulting signal 108 to the VSB modulator 112. The encryption module 110 can include hardware logic, instructions, or any combination thereof, to add a conditional access (CA) portion, a digital rights management (DRM) portion, a program system information (PSI), or any combination of the above, to the digital MPEG transport stream signal 108.

The VSB modulator 112 is configured to convert the digital MPEG transport stream signal 108 to a VSB signal 114 and to transmit the VSB signal 114 to subscriber devices 118, 132 via a private access network 116. The VSB signal 114 can be an 8-VSB signal or a 16-VSB signal. In a particular embodiment, the VSB modulator 112 can include hardware logic, instructions, or any combination thereof, to add ATSC standards-compliant portions to the digital MPEG transport stream signal 108. For example, the VSB modulator 112 can add an ATSC wrapper that includes an ATSC FEC portion, an ATSC CRC portion, a recalculated version of the CRC portion within the satellite signal 104, ATSC descriptor files/tables, or any combination thereof, to the digital MPEG transport stream signal 108 before, during or after conversion to the VSB signal 114.

In a particular embodiment, the VSB modulator 112 transmits the VSB signal 114 to a digital television device 118 that communicates with the private access network 116 via a network interface 120. The digital television device 118 receives the VSB signal 114 at the ATSC receiver 122, and the television content carried by the VSB signal 114 is displayed at the display screen 130. In an alternative embodiment, such as when a subscriber television does not have an ATSC receiver, the VSB modulator 112 can transmit the VSB signal 114 to a set-top box device 132 that includes a set-top box ATSC receiver 136. The set-top box device 132 can process the VSB signal 114 and transmit television content carried by the VSB signal 114 to a television monitor 146 coupled to the set-top box device 132 via the display interface 144.

Figure 2:
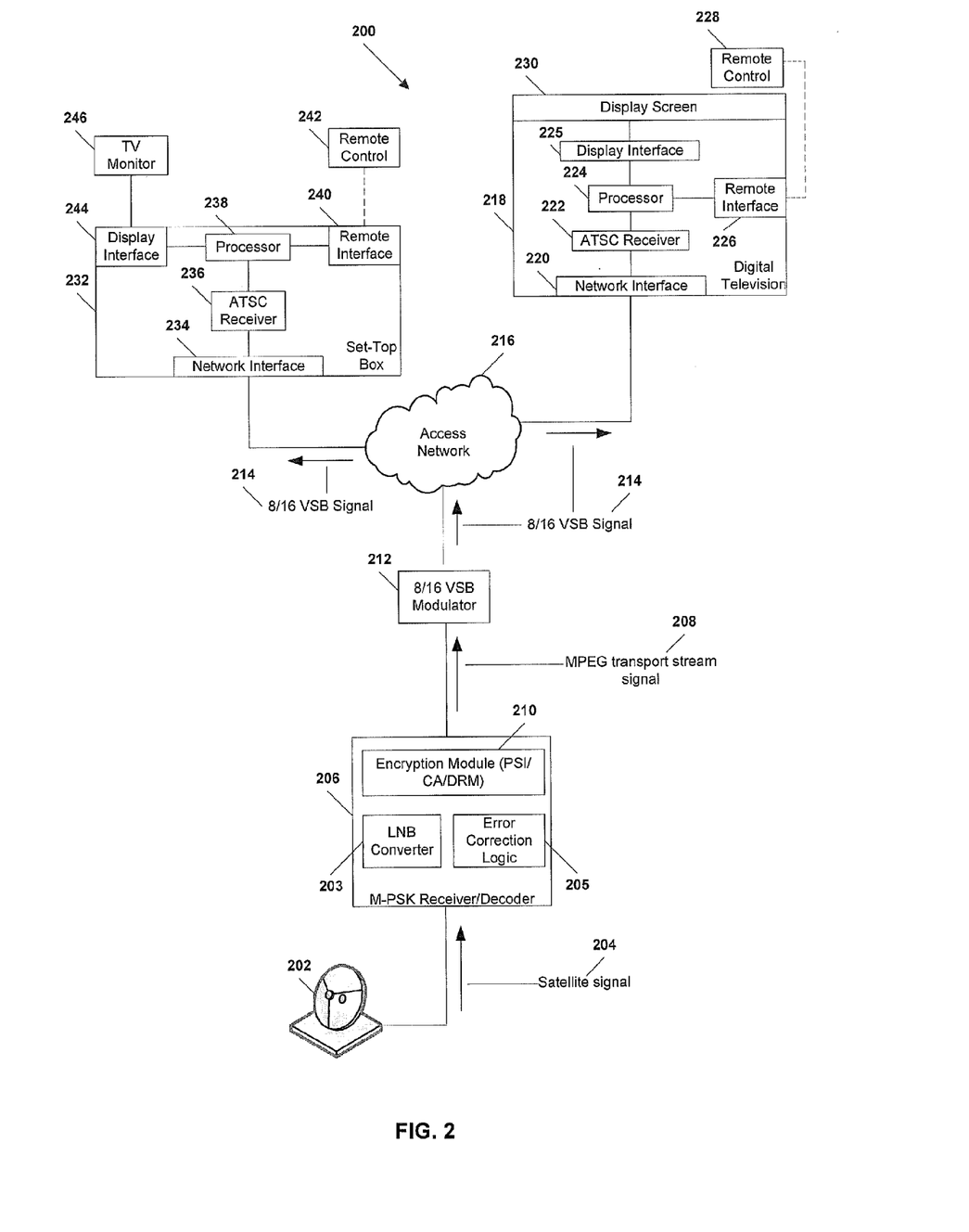
FIG. 2 is a block diagram illustrating a second particular embodiment of a system to deliver television content

Referring to FIG. 2, a second illustrative embodiment of a system to deliver television content by processing a satellite signal is illustrated and is generally designated 200. As shown, the system 200 includes a satellite dish 202. The satellite dish 202 is coupled to a receiver/decoder 206. In a particular embodiment, the receiver/decoder 206 can include a low-noise blockdown (LNB) converter 203, error correction logic 205, and an encryption module 210.

The receiver/decoder 206 is coupled to a vestigial sideband (VSB) modulator 212. In an illustrative embodiment, the VSB modulator 212 can be configured to transmodulate signals to 8-VSB signals, 16-VSB signals, or any combination thereof. Additionally, the VSB modulator 212 can be configured to transmit VSB signals 214 carrying television content to subscriber devices such as a digital television device 218, a set-top box device 232, or any combination thereof, via a private access network 216.

As illustrated in FIG. 2, a subscriber can receive VSB signals 214 via the private access network 216 at a digital television device 218. In a particular embodiment, the digital television device 218 can receive VSB signals 214 via a network interface 220 that communicates with an Advanced Television Systems Committee standards-compliant receiver ("ATSC receiver") 222. The ATSC receiver 220 is coupled to a processor 224 that communicates with a display screen 230 via a display interface 225. Additionally, the processor 224 can be coupled to a remote interface 226, through which the processor 224 receives commands from a remote control device 228.

In one embodiment, a subscriber can receive VSB signals 214 via the private access network 216 at a set-top box device 232. In a particular embodiment, the set-top box device 232 can receive VSB signals 214 via a set-top box network interface 234 that communicates with a set-top box ATSC receiver 236. The set-top box ATSC receiver 236 is coupled to a set-top box processor 238 that communicates with a television monitor 246 via a set-top box display interface 244. Additionally, the set-top box processor 238 can be coupled to a set-top box remote interface 240, through which the processor 238 receives commands from a remote control device 242.

In a particular embodiment, a satellite signal 204 having a radio frequency (RF) portion and a Moving Pictures Experts Group (MPEG) portion can be received from the satellite dish 202 at the receiver/decoder 206. The satellite signal 204 can be, for example, a M-phase shift keying PSK (M-PSK) signal, and the receiver/decoder 206 can be a M-PSK receiver/decoder. In an illustrative embodiment, the satellite signal 204 can be received at the dish via C-band transport frequencies (3700 MHz-4200 MHz) or Ku-band transport frequencies (11,700 MHz-22,200 MHz), and the receiver/decoder 206 can convert the satellite signal 204 to L-band transport frequencies (500 MHz-2500 MHz) via the LNB converter 203.

The receiver/decoder 206 decodes the satellite signal 204 to produce a digital MPEG transport stream signal 208. In a particular embodiment, the receiver/decoder 206 can include hardware logic, computer program instructions, or any combination thereof, to remove the RF portion of the satellite signal 204 when decoding the satellite signal 204 without substantially altering or affecting the MPEG portion. In an illustrative embodiment, the digital MPEG transport stream signal 208 produced by decoding the satellite signal 204 can include a forward error correction (FEC) portion, a cyclical redundancy check portion, a conditional access portion, any other portion suitable to correct errors and restrict access to the digital MPEG transport stream signal 208, or any combination thereof. In this embodiment, the receiver/decoder 206 can include hardware logic, instructions, or any combination thereof, to remove the forward error correction (FEC) portion, the cyclical redundancy check portion, the conditional access portion, any portion of the digital MPEG transport stream signal 208 besides the MPEG portion, or any combination thereof.

In an illustrative, non-limiting embodiment, the receiver/decoder 206 can detect errors in the digital MPEG transport stream signal 208 and correct the errors using the error correction logic 205. In one embodiment, the error correction logic 205 can include FEC hardware logic, instructions, or any combination thereof, at the receiver/decoder 206. In another embodiment, the error correction logic 205 can include hardware logic, instructions, or any combination thereof, to correct errors according to FEC portions carried by the satellite signal.

The receiver/decoder 206 is configured to transmit the digital MPEG transport stream signal 208 to the VSB modulator 212. In a particular embodiment, the receiver/decoder 206 can be configured to encrypt the digital MPEG transport stream signal via the encryption module 210, prior to transmitting the signal 208 to the VSB modulator 212. The encryption module 210 can include hardware logic, instructions, or any combination thereof, to add a conditional access (CA) portion, a digital rights management (DRM) portion, a program system information (PSI), or any combination of the above, to the digital MPEG transport stream signal 208.

The VSB modulator 212 is configured to convert the digital MPEG transport stream signal 208 to a VSB signal 214 and to transmit the VSB signal 214 to subscriber devices 218, 232 via a private access network 216. The VSB signal 214 can be an 8-VSB signal or a 16-VSB signal. In a particular embodiment, the VSB modulator 212 can include hardware logic, instructions, or any combination thereof, to add ATSC standards-compliant portions to the digital MPEG transport stream signal 208. For example, the VSB modulator 212 can add an ATSC wrapper that includes an ATSC FEC portion, an ATSC CRC portion, a recalculated version of the CRC portion within the satellite signal 204, ATSC descriptor files/tables, or any combination thereof, to the digital MPEG transport stream signal 208 before, during or after conversion to the VSB signal 214.

In a particular embodiment, the VSB modulator 212 transmits the VSB signal 214 to a digital television device 218 that communicates with the private access network 216 via a network interface 220. The digital television device 218 receives the VSB signal 214 at the ATSC receiver 222, and the television content carried by the VSB signal 214 is displayed at the display screen 230. In an alternative embodiment, such as when a subscriber television does not have an ATSC receiver, the VSB modulator 212 can transmit the VSB signal 214 to a set-top box device 232 that includes a set-top box ATSC receiver 236. The set-top box device 232 can process the VSB signal 214 and transmit television content carried by the VSB signal 214 to a television monitor 246 coupled to the set-top box device 232 via the display interface 244.

Figure 3:
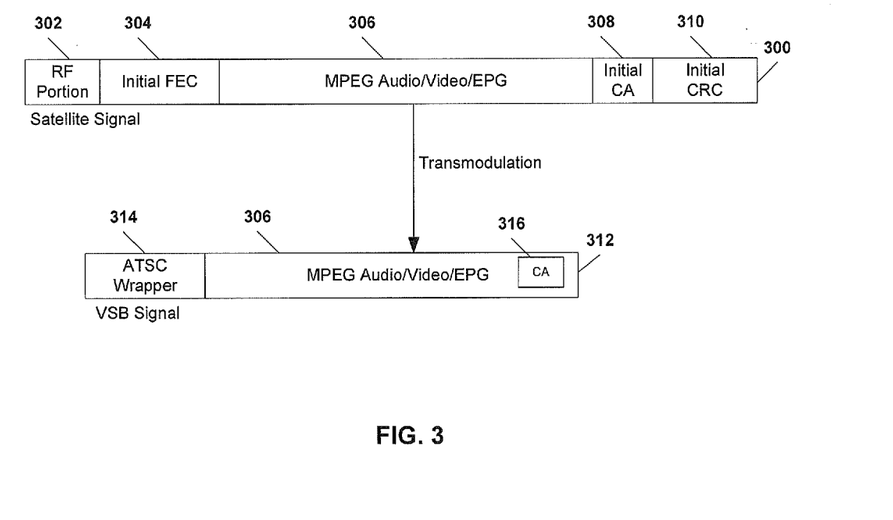
FIG. 3 is a block diagram illustrating a general diagram showing data fields of signals carrying television content.

Referring to FIG. 3, a general diagram is shown to illustrate data fields of signals carrying television content are illustrated before and after transmodulation from a satellite signal 300 to a vestigial sideband (VSB) signal 312 using the system described with reference to FIG. 1. A satellite signal 300 includes a radio frequency (RF) portion 302 and a Moving Pictures Experts Group (MPEG) portion 306 that can include an audio portion, a video portion, an electronic program guide (EPG) portion, or any combination thereof. In an illustrative embodiment, the satellite signal 300 can also include an initial forward error correction portion 304, a conditional access portion 308, and an initial cyclical redundancy check (CRC) portion 310.

The VSB signal 312 produced by transmodulation of the satellite signal 300 includes the MPEG portion 306. In a particular embodiment, the VSB signal 312 can also include an Advanced Television Systems Committee standards-compliant (ATSC) wrapper 314 that includes an ATSC FEC portion, an ATSC CRC portion, ATSC descriptor files/tables, or any combination of the above. In an illustrative embodiment, the ATSC CRC portion 316 can be a recalculated version of the initial CRC portion 310. In a particular embodiment, the MPEG portion 306 is unaltered or substantially unaltered after transmodulation. In an alternative, non-limiting embodiment, the MPEG portion 306 can be unaltered except for its encryption via a conditional access portion 318 that is integrated with the MPEG portion 306.

Figure 4:
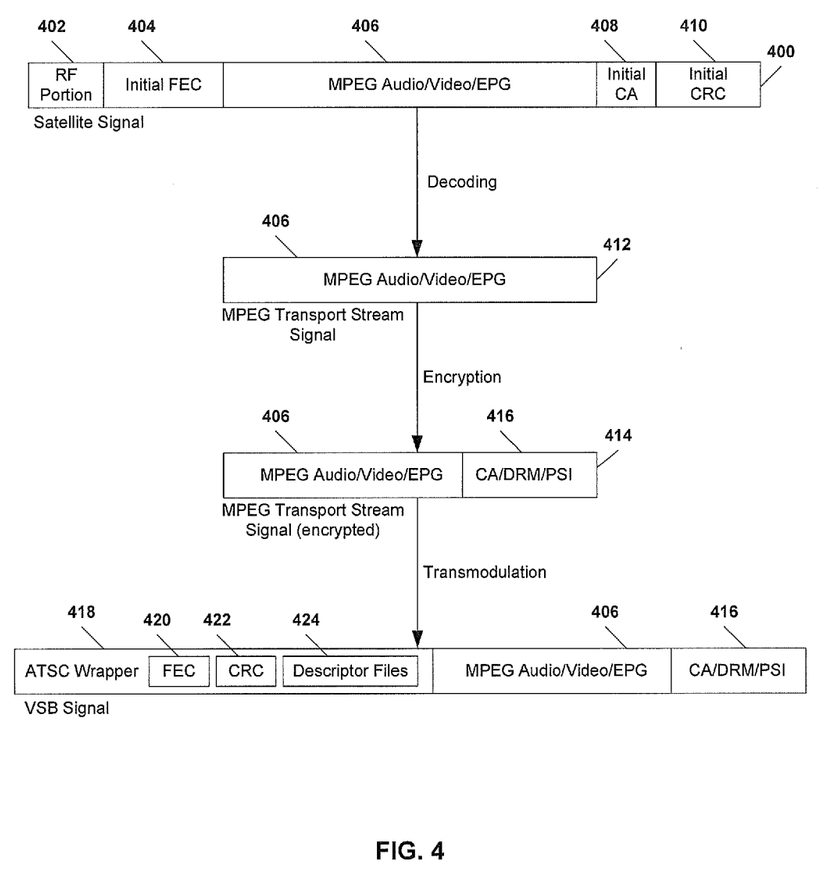
FIG. 4 is a block diagram illustrating a general diagram showing data fields of signals carrying television content.

Referring to FIG. 4, a general diagram is shown to illustrate data fields of signals carrying television content are illustrated before and after various aspects of signal processing described with reference to FIG. 1. A satellite signal 400 includes a radio frequency (RF) portion 402 and a Moving Pictures Experts Group (MPEG) portion 406 that can include an audio portion, a video portion, an electronic program guide (EPG) portion, or any combination thereof. In an illustrative embodiment, the satellite signal 400 can also include an initial forward error correction portion 404, a conditional access portion 408, and an initial cyclical redundancy check (CRC) portion 410.

Decoding of the satellite signal 400, for example, by the receiver/decoder 106 illustrated in FIG. 1, produces a digital MPEG transport stream signal 412. In an illustrative embodiment, the digital MPEG transport stream signal 412 includes only the MPEG portion 406 of the satellite signal 400 in digital format. As shown in FIG. 4, the digital MPEG transport stream signal 412 can be encrypted, for example, by the encryption module 110 illustrated in FIG. 1. This encryption can produce an encrypted digital MPEG transport stream signal 414 that includes the MPEG portion 406 of the satellite signal 400 in digital format and an encryption portion 416 appended to the MPEG portion 406. In a particular embodiment, the encryption portion 416 can include a conditional access portion, a digital rights management portion, a program systems information portion, or any combination thereof.

In the particular embodiment shown in FIG. 4, the encrypted digital MPEG transport stream signal 414 is transmodulated, for example, by the VSB modulator 112 illustrated in FIG. 1. This transmodulation produces a vestigial sideband (VSB) signal 418 that includes the MPEG portion 406 and the encryption portion 416. In a particular embodiment, the VSB signal 418 can also include an Advanced Television Systems Committee standards-compliant (ATSC) wrapper 418 that includes an ATSC FEC portion 420 and an ATSC CRC portion 422, and ATSC descriptor files 424. The ATSC wrapper 418 can be appended to the MPEG portion 406 and the encryption portion 416 by the VSB modulator before, during, or after transmodulation.

Figure 5:
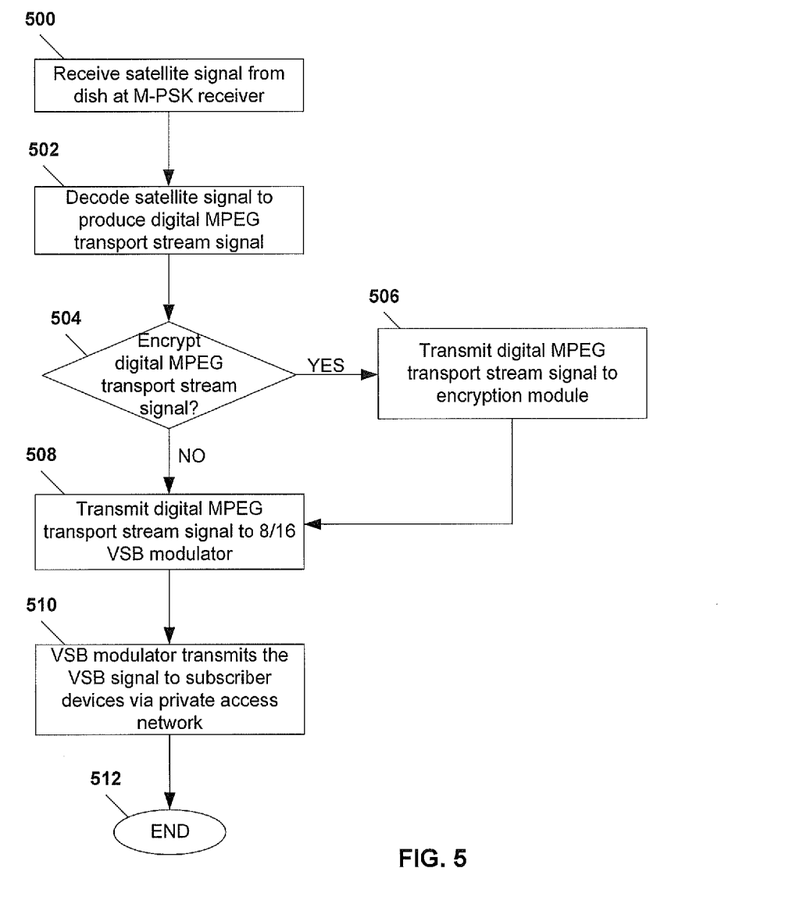
FIG. 5 is a flow diagram illustrating a particular embodiment of a method of processing a satellite signal to deliver television content.

Referring to FIG. 5, an embodiment of a method of processing a satellite signal to deliver television content is illustrated. At block 500, a satellite signal is received at a receiver. In an illustrative embodiment, the satellite signal can be a M-phase shift keying (M-PSK) signal, such as a quadrature phase shift keying (QPSK) or an octal phase shift keying (OPSK) signal. In this embodiment, the receiver can be a M-PSK receiver. Moving to block 502, the receiver decodes the satellite signal to produce a digital Moving Pictures Experts Group (MPEG) transport stream signal. In a particular embodiment, decoding the satellite signal and producing the digital MPEG transport stream signal can include removing a radio frequency (RF) portion, an initial forward error correction (FEC) portion, an initial cyclical redundancy check (CRC) portion, a conditional access (CA) portion, or any combination thereof, from the satellite signal, while leaving an MPEG portion carried by the satellite signal at least substantially intact.

Continuing to decision step 504, in a particular embodiment, the receiver can include logic or instructions to determine whether the digital MPEG transport stream should be encrypted. If the receiver determines that the MPEG transport stream should not be encrypted, the method proceeds to block 508. Conversely, if the receiver determines that the MPEG transport stream should be encrypted, the method proceeds to block 506, and the receiver transmits the MPEG transport stream to an encryption module. The method then continues to block 508. In an illustrative embodiment, the MPEG transport stream can be encrypted at the encryption module by appending a conditional access portion, a digital rights management (DRM) portion, a program system information portion (PSI), or any combination thereof, to the MPEG portion of the digital MPEG transport stream signal. In another embodiment, the MPEG portion of the digital MPEG transport stream signal can be encrypted, by integrating conditional access information with the MPEG portion.

At block 508, the digital MPEG transport stream signal is transmitted to a VSB modulator, where it is transmodulated to produce an 8-VSB or 16-VSB signal that includes the MPEG portion. If the digital MPEG transport stream signal is not encrypted, it is transmitted to the VSB modulator by the receiver. If the digital MPEG transport stream signal is encrypted, it is transmitted to the VSB modulator by the encryption module. In a particular embodiment, the VSB modulator can also append an ATSC wrapper that includes an ATSC FEC portion, an ATSC CRC portion, a recalculated version of the CRC portion within the satellite signal, ATSC descriptor files/tables or any combination thereof, to the MPEG portion before, during or after transmodulation of the digital MPEG transport stream signal to the VSB signal. Moving to block 510, the VSB modulator transmits the VSB signal to one or more subscriber devices, such as digital television devices, set-top box devices, or any combination thereof, via a private access network. The method terminates at 512.

Figure 6:
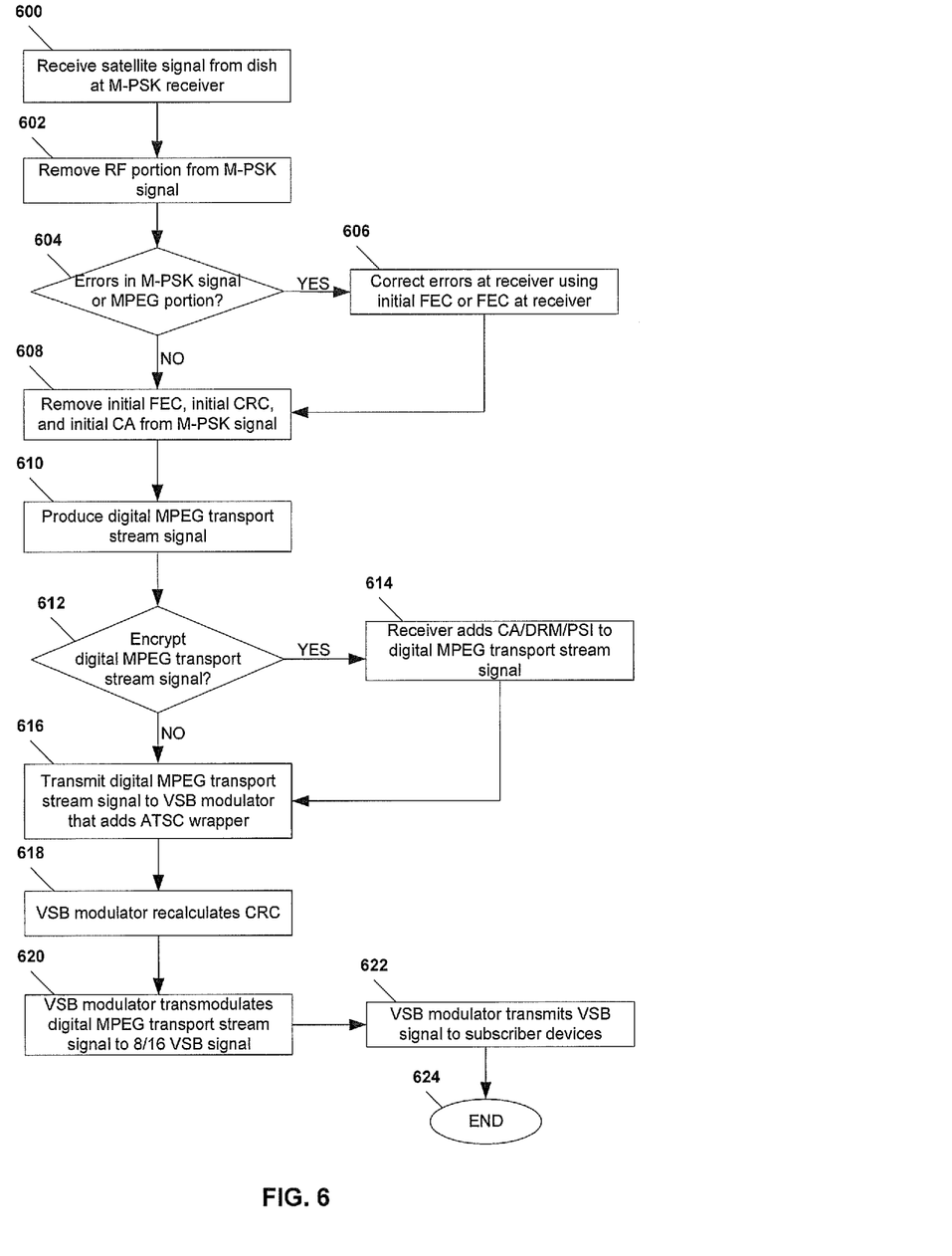
FIG. 6 is a flow diagram illustrating a second particular embodiment of a method of processing a satellite signal to deliver television content.

Referring to FIG. 6, another embodiment of a method of processing a satellite signal to deliver television content is illustrated. At block 600, a M-PSK satellite signal that includes a Moving Pictures Experts Group (MPEG) portion, a radio frequency (RF) portion, an initial forward error correction (FEC) portion, an initial cyclical redundancy check (CRC) portion, and an initial conditional access (CA) portion is received at a M-PSK receiver. Moving to block 602, the receiver removes the RF portion from the satellite signal. In a particular embodiment, the method continues to decision step 604, and the receiver determines whether errors exist within the M-PSK signal or the MPEG portion carried by the signal. If no errors exist, the method continues to block 608. On the other hand, if errors exist, the method proceeds to block 606, and the receiver corrects the errors using the FEC portion carried by the M-PSK signal, FEC logic at the receiver, or any combination thereof. The method then moves to block 608.

At block 608, the receiver removes the initial FEC portion, the initial CRC portion, and the initial CA portion, or any combination thereof, from the satellite signal, while leaving the MPEG portion intact. Continuing to block 610, the receiver produces a digital MPEG transport stream signal from the satellite signal. The digital MPEG transport stream signal includes the MPEG portion carried by the satellite signal.

Proceeding to decision step 612, in a particular embodiment, the receiver can include logic or instructions to determine whether the digital MPEG transport stream signal should be encrypted. If the receiver determines that the digital MPEG transport stream signal should not be encrypted, the method continues to block 616. On the other hand, if the receiver determines that the digital MPEG transport stream signal should be encrypted, the method proceeds to block 614, and an encryption module integrated with the receiver appends a conditional access portion, a digital rights management (DRM) portion, a program system information portion (PSI), or any combination thereof, to the MPEG portion of the digital MPEG transport stream signal. The method then continues to block 616.

At block 616, the receiver transmits the digital MPEG transport stream signal (encrypted or not encrypted) to a VSB modulator. In a particular embodiment, the VSB modulator appends an Advanced Television Systems Committee standards-compliant (ATSC) wrapper to the MPEG portion. The ATSC wrapper can include an ATSC FEC portion, ATSC descriptor files/tables, or any combination of the above. The method continues to block 618, and the VSB modulator recalculates the initial CRC portion based at least partially on the ATSC FEC portion, and adds the ATSC CRC portion to the ATSC wrapper. The method then proceeds to block 620, and the digital MPEG transport stream signal is transmodulated to a 8-VSB or 16-VSB signal. Moving to block 622, the VSB modulator transmits the VSB signal to one or more subscriber devices, such as digital television devices, set-top box devices, or any combination thereof, via a private access network. The method terminates at 624.

Though the aspects of the disclosed methods have been presented in a certain order, for ease of description, certain portions of the method may be performed in a different order or simultaneously. For example, in FIG. 6, the addition of an ATSC wrapper, recalculated CRC portion, or any combination thereof, may take place before, during, or after transmodulation of the digital MPEG transport stream signal to a VSB signal.

In conjunction with the configuration of structure described herein, the system and method disclosed provide a system and method of converting a satellite signal to a signal that can transport television content over a consumer-grade coaxial cable network, such as a Radio Guide 6 (RG-6) network. In one embodiment, the system receives a satellite signal, such as a M-PSK signal and transmodulates it to an ATSC compliant 8/16 VSB signal, without altering the MPEG portion carried by the satellite signal. Because VSB signals can support large data payloads, transmitting television content using VSB signals supports multicasting and data transmission with television content, including digital and high-definition television content. Additionally, in a particular embodiment, the use of ATSC standards allow "off the shelf" digital television receivers to decode the MPEG transport streams carried by the VSB signals without the use of a set-top box device.

Figure 7:
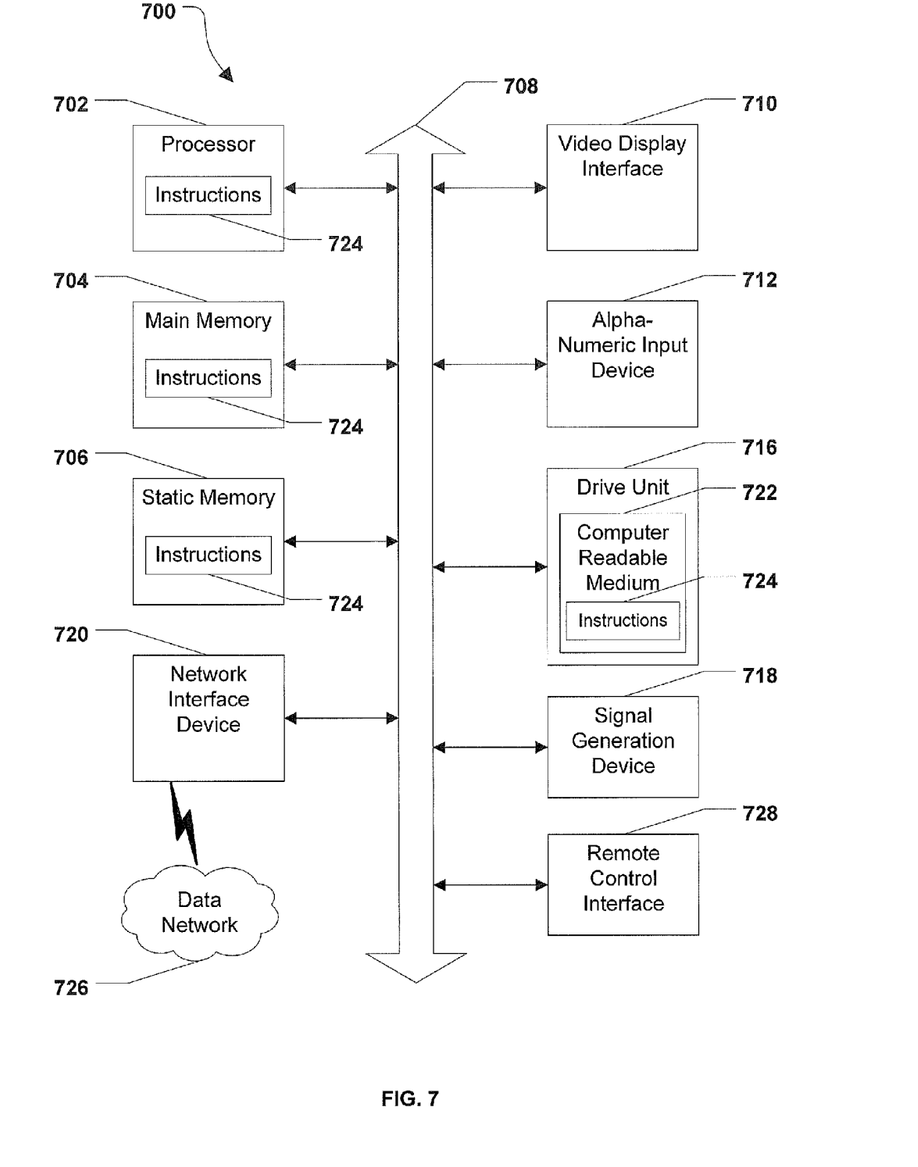
FIG. 7 is a diagram of an illustrative embodiment of a general computer system.

Referring to FIG. 7, an illustrative embodiment of a general computer system is shown and is designated 700. The computer system 700 can include a set of instructions that can be executed to cause the computer system 700, or a portion thereof, to perform any one or more of the methods or computer based functions disclosed herein. The computer system 700, or any portion thereof, may operate as a standalone device or may be a hardware or software module within a satellite signal receiver, encryption module, VSB modulator, or a network device, as illustrated in FIGS. 1 and 2.

The computer system 700 can also be implemented as or incorporated into various other devices, such as a digital television or set-top box device, or any other machine capable of executing a set of instructions (sequential or otherwise) that specify actions to be taken by that machine. In a particular embodiment, the computer system 700 can be implemented using electronic devices that provide audio, video or data communication. Further, while a single computer system 700 is illustrated, the term "system" shall also be taken to include any collection of systems or sub-systems that individually or jointly execute a set, or multiple sets, of instructions to perform one or more computer functions, such as the systems illustrated in FIGS. 1 and 2.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a remote control input, an input control panel, a keyboard, a mouse, a gaming station input, or one or more keys disposed on a set-top box device. The computer system 700 can also include a disk drive unit 716, a signal generation device 718, and a network interface device 720.

In an illustrative embodiment, the computer system 700 can include a remote control interface 728, such as the remote control interface 216 of the set-top box device illustrated in FIG. 2. The remote control interface 728 can receive inputs from a remote control device.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives instructions 724 responsive to a propagated signal, so that a device connected to a network 726 can communicate audio, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving at a receiver from a satellite dish a satellite signal;
   removing an initial radio frequency portion from the satellite signal without altering a sequence of media contents of a moving picture experts group portion of the satellite signal and without altering a quality of the media contents of the moving picture experts group portion;
   removing an initial conditional access portion from the satellite signal without altering the sequence of media contents of the moving picture experts group portion of the satellite signal and without altering the quality of the media contents of the moving picture experts group portion;
   correcting an error in the satellite signal in response to detection of the error in the satellite signal;
   decoding the satellite signal at the receiver to produce a digital moving picture experts group transport stream signal, the digital moving picture experts group transport stream signal including the moving picture experts group portion;
   encrypting the digital moving picture experts group transport stream signal at the receiver to form an encrypted digital moving picture experts group transport stream signal; and
   sending the encrypted digital moving picture experts group transport stream signal from the receiver to a modulator to convert the encrypted digital moving picture experts group transport stream signal to vestigial sideband signals.

2. The method of claim 1, wherein the vestigial sideband signals include a 16-VSB signal.

3. The method of claim 1, wherein the vestigial sideband signals include a 8-VSB signal.

4. The method of claim 1, wherein the vestigial sideband signals include high-definition television content.

5. The method of claim 1, wherein the modulator adds an Advanced Television Systems Committee standards-compliant wrapper to the encrypted corrected digital moving picture experts group transport stream signal.

6. The method of claim 5, wherein the Advanced Television Systems Committee standards-compliant wrapper further comprises a recalculation of an initial cyclical redundancy check portion, wherein the initial cyclical redundancy check portion is associated with the satellite signal.

7. The method of claim 1, wherein a digital rights management portion is added to the moving picture experts group portion when the digital rights management portion is encrypted.

8. A system comprising:
   a converter to receive a satellite signal at first transport frequencies and to convert the satellite signal to second transport frequencies; and
   a processor, wherein the processor removes a radio frequency portion from the satellite signal without altering a sequence of media contents of a moving picture experts group portion of the satellite signal and without altering a quality of the media contents of the moving picture experts group portion, wherein the processor, in response to a determination that the moving picture experts group portion includes an error, corrects the error in the moving picture experts group portion with error correction data of the satellite signal, wherein the processor generates a digital moving picture experts group transport stream signal, wherein the processor encrypts the digital moving picture experts group transport stream signal to produce an encrypted digital moving picture experts group transport stream signal, and wherein the processor sends the encrypted digital moving picture experts group transport stream signal to a sideband modulator.

9. The system of claim 8, wherein the converter is a low-noise blockdown converter.

10. The system of claim 8, wherein the processor adds a program system information portion to the encrypted digital moving picture experts group transport stream signal.

11. The system of claim 8, wherein the processor removes an initial forward error correction portion from the satellite signal.

12. The system of claim 11, wherein the error correction data is obtained from the initial forward error correction portion.

13. The system of claim 8, wherein the processor removes an initial cyclical redundancy check portion from the satellite signal.

14. The system of claim 8, wherein the processor removes an initial conditional access portion from the satellite signal.

15. The system of claim 8, wherein the encrypted digital moving picture experts group transport stream signal sent to the sideband modulator includes a conditional access portion, a digital rights management portion, a program system information portion, or any combination thereof.

16. A computer-readable device storing processor executable instructions that when executed by a processor, cause the processor to perform operations including:

decoding a received satellite signal to remove a radio frequency portion, an initial forward error correction portion, an initial conditional access portion, and an initial cyclical redundancy check portion from the received satellite signal without altering a sequence of media contents of a moving picture experts group portion of the received satellite signal and without substantially altering a quality of the media contents of the moving picture experts group portion;

in response to a determination that the moving picture experts group portion includes an error, correcting the error in the moving pictures expert group portion with error correction data from the initial forward error correction portion;

generating a digital moving picture experts group transport stream signal, wherein the digital moving picture experts group transport stream signal includes the moving picture experts group portion;

encrypting the digital moving picture experts group transport stream signal to generate an encrypted digital moving picture experts group transport stream signal; and sending the encrypted digital moving picture experts group transport stream signal to a modulator to convert the encrypted digital moving picture experts group transport stream signal to vestigial sideband signals.

17. The computer-readable device of claim 16, wherein the operations further include converting the received satellite signal from first transport frequencies to second transport frequencies.

18. The computer-readable device of claim 16, wherein the modulator adds an Advanced Television Systems Committee standards-compliant wrapper to the encrypted digital moving picture experts group transport stream signal.

19. The computer-readable device of claim 16, wherein the encrypted digital moving picture experts group transport stream signal sent to the modulator includes a conditional access portion, a digital rights management portion, a program system information portion, or any combination thereof.

20. The computer-readable device of claim 16, wherein the vestigial sideband signals are multicast to devices from the modulator.

* * * * *